United States Patent
Siva et al.

(10) Patent No.: US 7,619,971 B1
(45) Date of Patent: Nov. 17, 2009

(54) METHODS, SYSTEMS, AND COMPUTER PROGRAM PRODUCTS FOR ALLOCATING EXCESS BANDWIDTH OF AN OUTPUT AMONG NETWORK USERS

(75) Inventors: Meera Siva, San Jose, CA (US); Justin Chueh, Palo Alto, CA (US); Ravi Tangirala, San Jose, CA (US); Rajarshi Gupta, San Ramon, CA (US); Erik R. Swenson, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 770 days.

(21) Appl. No.: 11/129,991

(22) Filed: May 16, 2005

(51) Int. Cl.
  *H04J 3/14* (2006.01)
(52) U.S. Cl. .................... 370/230.1; 370/231
(58) Field of Classification Search ............ None
  See application file for complete search history.

(56) References Cited

U.S. PATENT DOCUMENTS

2005/0120102 A1* 6/2005 Gandhi et al. ............... 709/223
2005/0163048 A1* 7/2005 Arora et al. ................. 370/230
2005/0163138 A1* 7/2005 Kanazawa .................. 370/412

OTHER PUBLICATIONS

St. Sauver, Joe "Understanding the Basics of Traffic Shaping," http://cc.uoregon.edu/cnews/winter2002/traffic.html., (2002).
Dawson, Terry,"Traffic Shaping," http://www.linuxdevcenter.com/pub/a/linux/2000/08/24/LinuxAdmin.html, (Aug. 24, 2000).

* cited by examiner

*Primary Examiner*—Raj Jain
(74) *Attorney, Agent, or Firm*—Jenkins, Wilson, Taylor & Hunt, P.A.

(57) ABSTRACT

Methods, systems, and computer program products for allocating excess bandwidth of an output among network users are disclosed. According to one method, packets associated with a plurality of network users for forwarding to an output are received. The packets can include a first non-committed information rate (CIR) packet associated with a first network user. The method can include a step for maintaining a count of non-CIR packets sent for the first network user. Further, the method can include preventing the first non-CIR packet from being forwarded to the output in response to the count having a predetermined relationship with respect to a threshold level.

39 Claims, 5 Drawing Sheets

METHODS, SYSTEMS, AND COMPUTER PROGRAM PRODUCTS FOR ALLOCATING EXCESS BANDWIDTH OF AN OUTPUT AMONG NETWORK USERS

TECHNICAL FIELD

The subject matter described herein relates to allocating bandwidth among network users. More particularly, the subject matter described herein relates to methods, systems, and computer program products for allocating excess bandwidth of an output among network users.

BACKGROUND ART

In a network environment, a queuing system may be utilized for queuing multiple packets on an output, such as an output port or queue. For example, network switches, routers and various other network devices may include such a queuing system and an output for forwarding in a network environment. The output may be connected to a network and have a maximum bandwidth available for transmitting packets to the network. The queuing system may divide available bandwidth among the received packets based on, for example, priority, destination, and source of the packet.

The available bandwidth of an output may also be divided based on a network user associated with the packet. For example, a network service provider may sell bandwidth of the output to a customer. The network service provider may guarantee that a certain amount of bandwidth will be available to packets sent from the customer. In this case, the guaranteed amount of bandwidth must be reserved for the customer on the aggregated output. When more than one customer is guaranteed bandwidth, the available bandwidth must be divided among the customers. Typically, the queuing system determines whether a customer's use of the aggregated output has exceeded the guaranteed bandwidth for the customer.

A queuing system can include a scheduler for determining whether a customer's use of the output has been exceeded. When a packet is determined to be a committed information rate (CIR) packet, then the customer's guaranteed bandwidth is not exceeded. CIR packets are forwarded to the aggregated output because they are part of the customer's guaranteed bandwidth. Otherwise, if the packet is a non-CIR packet, then the customer's guaranteed bandwidth may be exceeded by forwarding the packet to the output. Non-CIR packets may be sent when excess bandwidth is available on the output.

In order to schedule packets onto an output, the current bandwidth being consumed by packet traffic on the output can be measured. One method for measuring the bandwidth consumed by packet traffic is to use token buckets. A token bucket is a hardware- or software-implemented algorithm that allows packets to be scheduled based on the number of tokens available in a token bucket. Tokens in the token bucket are refreshed at a predetermined rate. As long as there are sufficient tokens available in the token bucket, packets can be transmitted. If the bucket is empty or contains an insufficient number of tokens, packets waiting to be transmitted may be queued until sufficient tokens are present in the token bucket to allow the packet to be transmitted.

A queuing system can include a CIR token bucket and an excess or non-CIR token bucket for determining whether the packet is a CIR packet. If the CIR token bucket has tokens, then the packet is labeled as a CIR packet. If the CIR token bucket does not have tokens, the packet is an excess packet. If the received packet is a low priority packet or forwarded from a congested network, the packet may be labeled as a non-CIR packet. In those instances, irrespective of the CIR token bucket state, the packet is labeled as a non-CIR packet.

Figure 1:
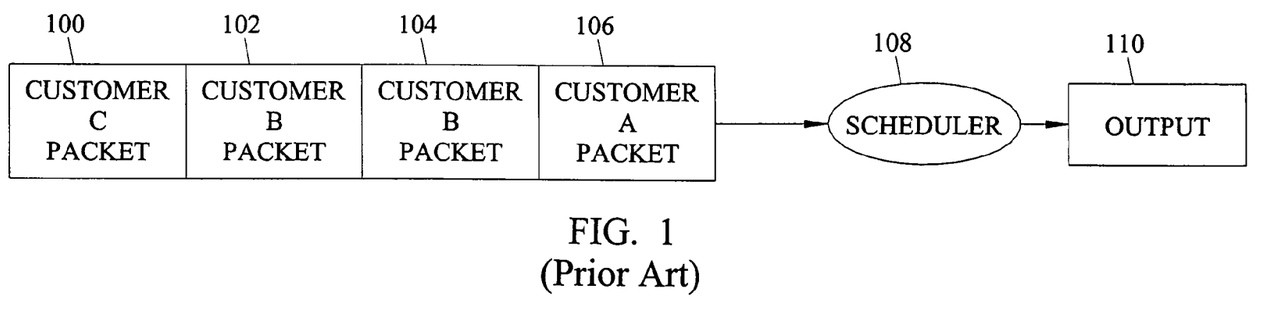
FIG. 1 (Prior Art) is an exemplary queuing system for scheduling customer packets on the excess bandwidth of a shared output.

Typically, a network service provider reserves a predetermined amount of bandwidth or excess bandwidth for sending customer packets when all of the customers have exceeded their guaranteed amount of bandwidth. The excess bandwidth may be available for sending the stored packets when all received CIR packets have been sent. FIG. 1 is an exemplary queuing system for scheduling customer packets on the excess bandwidth of a shared output. Referring to FIG. 1, the queuing system is receiving a stream of packets 100, 102, 104, and 106 for scheduling by scheduler 108 to queue on an aggregated output 110. Packets 100, 102, 104, and 106 are non-CIR packets. These packets are forwarded by scheduler 108 when the excess bandwidth of output 112 is available. Packets 100, 102, 104, and 106 are forwarded to output 112 in a first-in first-out (FIFO) manner.

One problem associated with current queuing systems, such as the queuing system shown in FIG. 1, is that customers may obtain an unfair proportion of the excess bandwidth. For example, referring to FIG. 1, four customer packets are being forwarded by scheduler 108. Two of the stored packets belong to customer B. The other two packets belong to customers A and C. In this example, it is assumed that customer A, B, and C have their CIR bandwidth requirements met and all of the queued packets are non-CIR packets. In this case, when all of the stored packets have been sent, customer B will have been provided twice the amount of excess bandwidth as customers A and C. Such a result can occur when one customer sends more packet traffic than the other customers. This results in an unfair distribution of customer packets being sent on the excess bandwidth. It is noted that even if each of customers A, B, and C had only one packet but customer B's packets were larger in comparison to customers A and C, then sending one packet of customer B results in higher bandwidth being allocated to customer B.

Figure 2:
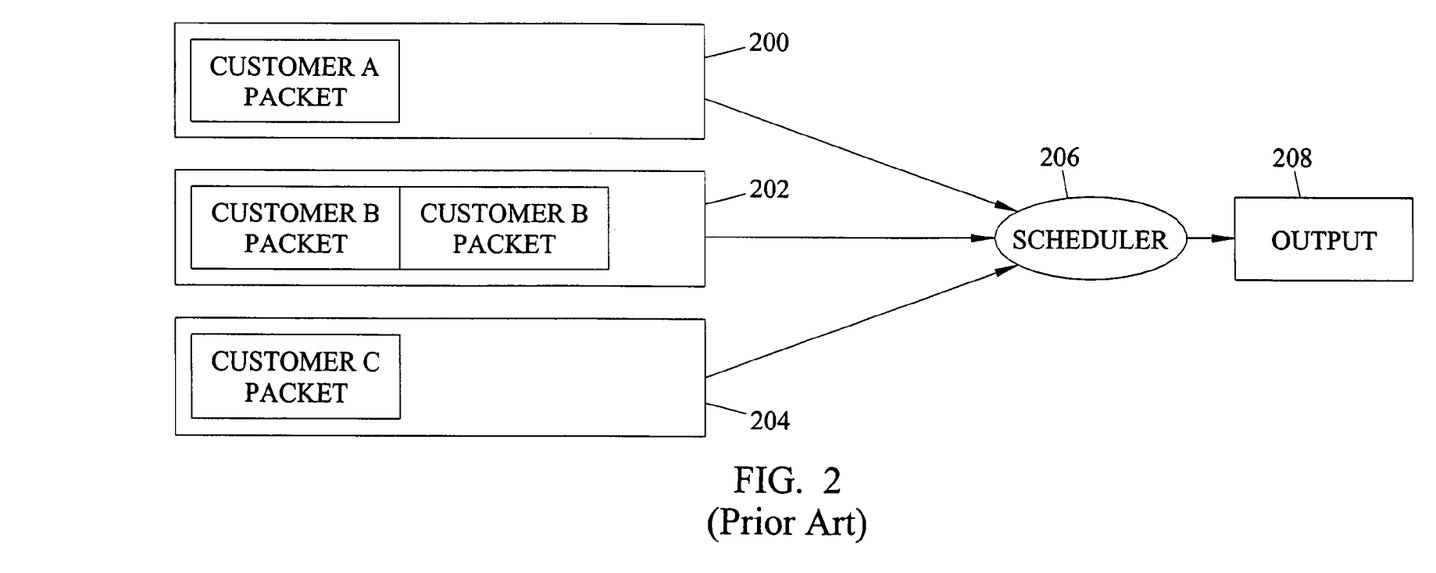
FIG. 2 (Prior Art) is an exemplary queuing system including traffic shaping capabilities for scheduling customer packets on the excess bandwidth of a shared output.

It can be advantageous to network service to provide the ability to distribute excess bandwidth among the customers sharing bandwidth on an aggregated output queue. One advantage of being able to distribute the excess bandwidth is that excess bandwidth can be sold based on a rate guarantee according to service class. Such distribution can be implemented by utilizing queuing systems with traffic shaping capabilities. FIG. 2 is an exemplary queuing system including traffic shaping capabilities for scheduling customer packets on the excess bandwidth of a shared output. Referring to FIG. 2, the queuing system can include a plurality of queues 200, 202, and 204 for storing non-CIR packets of each customer. For example, queue 200 is assigned to only store the packets of customer A. A scheduler 204 forwards the customer packets from queues 200, 202, and 204 to an output 208 in a round-robin fashion such that the forwarding of packets is equally distributed among the customers for the excess bandwidth. Alternatively, stored packets may be forwarded based on weights. For example, two packets of customer A may be transmitted for every one packet of customer B and every one packet of customer C. Alternatively, the round-robin or weight implementation can be based on byte count rather than packet count since byte count is a more accurate measure of bandwidth. Customer packets for non-CIR traffic may be stored until sent or a queue becomes full. If the queue becomes full, packets for the queue may be killed.

A traffic shaping configuration as described with respect to FIG. 2 can be problematic for a number of reasons. For example, the traffic shaping configuration requires additional memory to store the packets until they can be forwarded. In addition, such a configuration introduces latency in scheduling multiple queues because packets are stored until they can be scheduled. Further, scheduling becomes more complex because packets must be selected from among many of queues associated with many customers.

Accordingly, in light of these difficulties associated with conventional queuing systems, there exists a need for improved methods, systems, and computer program products for allocating excess bandwidth of an output among a plurality of network users.

SUMMARY

According to one aspect, the subject matter described herein comprises methods, system, and computer program products for allocating excess bandwidth of an output among network users. One method includes receiving packets associated with a plurality of network users for forwarding to an output. The packets can include a first non-committed information rate (CIR) packet associated with a first network user. The method can include maintaining a count of non-CIR packets sent for the first network user. Further, the method can include a step for preventing the first non-CIR packet from being forwarded to the output in response to the count having a predetermined relationship with respect to a threshold level.

One system according to the subject matter described herein is a bandwidth allocation system for allocating excess bandwidth among a plurality of network users. The system can include a phantom scheduler for maintaining a count of non-committed-information-rate (non-CIR) packets sent for a first network user of a plurality of network users and for determining whether the count has a predetermined relationship with respect to a threshold level. Further, the system can include a rate limiter for receiving non-CIR packets for the network users. The non-CIR packets can include a first non-CIR packet to be sent for the first network user. The rate limiter can also prevent the first non-CIR packet from being forwarded to an output in response to the count having the predetermined relationship with respect to the threshold level.

BRIEF DESCRIPTION OF THE DRAWINGS

Preferred embodiments of the subject matter described herein will now be explained with reference to the accompanying drawings of which.

DETAILED DESCRIPTION

Methods, systems, and computer program products for allocating excess bandwidth of an output among a plurality of network users according to embodiments of the subject matter described herein may be implemented in any suitable network device that aggregates packets from different users onto an output. For example, the methods, systems, and computer program products may be implemented in a packet forwarding device, such as an Ethernet switch or an IP router. The subject matter described herein fairly allocates the excess bandwidth at an output, such as an output queue or output port, of the network device. In one exemplary implementation, the subject matter described herein may be implemented as a computer program product comprising computer-executable instructions embodied in a computer readable medium accessible by a network device. Exemplary computer-readable media suitable for implementing the subject matter described herein include chip memory devices, optical disks, magnetic disks, application-specific integrated circuits, programmable logic devices, or any other medium capable of storing computer-executable instructions.

The subject matter described herein can efficiently allocate excess bandwidth of an aggregated output among a plurality of network users. In one exemplary implementation, committed information rate (CIR) packets may be forwarded to an output. As stated above, CIR packets are network packets that are guaranteed bandwidth on the output. A count of the total number of sent non-CIR packets or a parameter of the non-CIR packets for each network user may be maintained. Non-CIR packets may be killed or prevented from being forwarded to the output in response to the counts having a predetermined relationship with respect to a threshold level. Because non-CIR packets may be killed based on the count of non-CIR packets, packets among different network users can be more efficiently allocated in the excess bandwidth. In particular, memory is not required for storing the non-CIR packets until they can be forwarded. Further, latency and complexity are reduced because non-CIR packets are immediately killed or forwarded to the output based on a count of a non-CIR packet.

Figure 3:
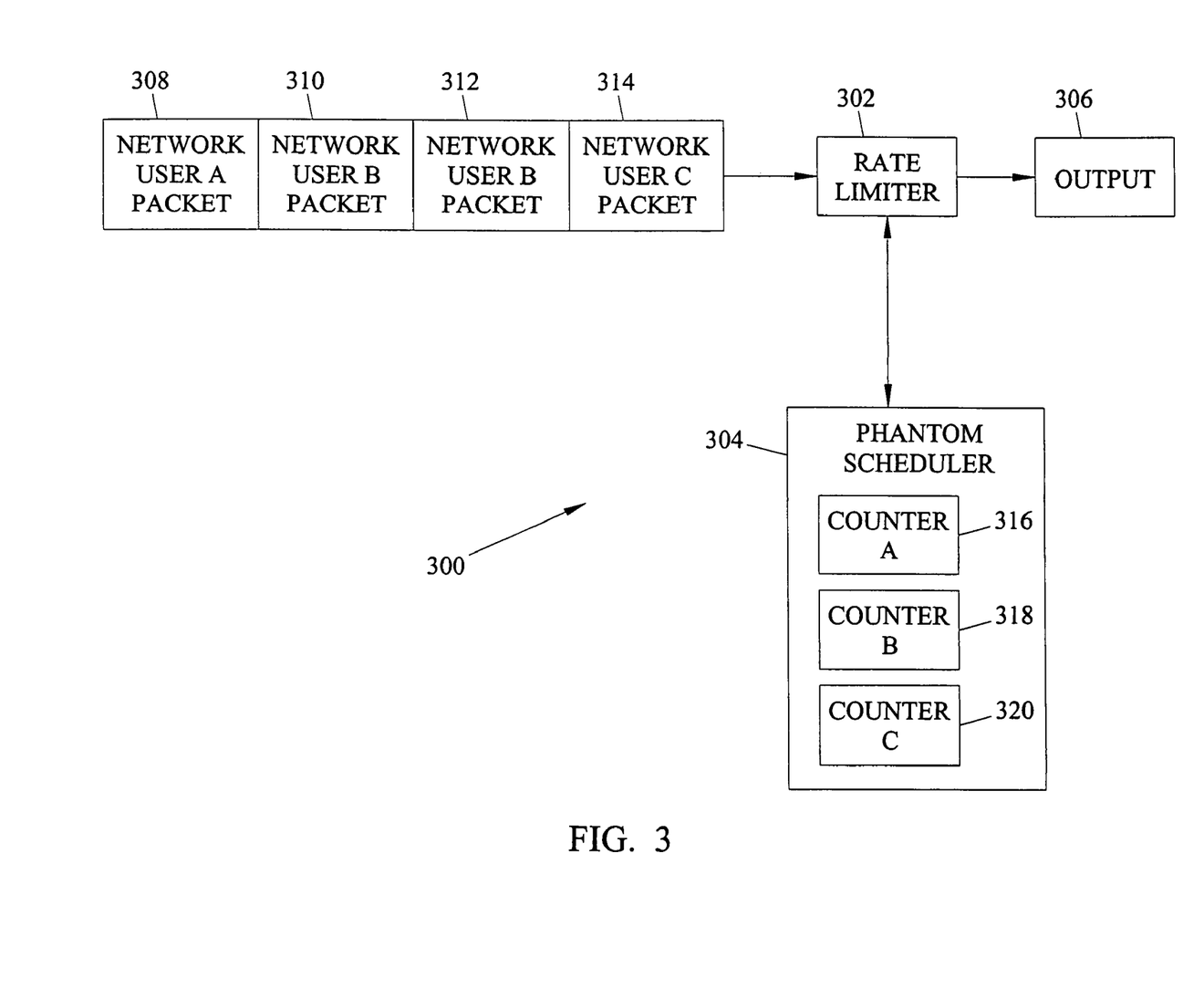
FIG. 3 is an exemplary bandwidth allocation system for allocating excess bandwidth of an output among a plurality of network users based on a non-CIR packet count according to an embodiment of the subject matter described herein.

FIG. 3 illustrates an exemplary bandwidth allocation system, generally designated 300, for allocating excess bandwidth of an output among a plurality of network users based on a non-CIR packet count according to an embodiment of the subject matter described herein. Referring to FIG. 3, system 300 includes a rate limiter 302, a phantom scheduler 304, and an aggregated output 306. System 300 can be implemented in a network device including components for forwarding network user CIR packets to output 306. As stated above, CIR packets are packets that are part of a network user's guaranteed bandwidth on output 306. Packets that are identified as non-CIR packets may be killed or forwarded to output 306. The excess bandwidth of output 306 is the difference between the bandwidth available on output 306 and the CIR bandwidths utilized by the network users using output 306.

Rate limiter 302 receives a plurality of network user packets including non-CIR packets 308, 310, 312, and 314 from network users A, B, and C. Packets 308, 310, 312, and 314 are shown in the order that they are received by rate limiter 302. Thus, in this example, packet 314 is received first, and packet 308 is received last. Rate limiter 302 determines the network user associated with each packet. Further, rate limiter 302 notifies scheduler 304 of the network user associated with each received non-CIR packet. Scheduler 304 includes counters 316, 318, and 320 for maintaining counts of non-CIR packets sent for network users A, B, and C, respectively. That is each time a non-CIR packet for a particular network user is sent, scheduler 304 may increment the count for the particular user. If a count for a network user is equal to or exceeds a predetermined threshold level, scheduler 304 may notify rate limiter 302, and rate limiter 302 may kill the packet associated with the network user or take steps to otherwise prevent the packets from being forwarded to output 306. If the count for the network user is less than the predetermined threshold level, the non-CIR packet can be forwarded to output 306. Further, if the count is less than the predetermined threshold level, scheduler 304 can increment the count in the counter associated with the network user.

Scheduler 304 is referred to as a phantom scheduler, because rather than maintaining actual queues, scheduler 304 maintains counts of non-CIR packets sent for each network user. Each count can be considered a phantom queue. A phantom queue is "scheduled" when its count is decremented based on the scheduling criteria, e.g., round-robin, weight, or priority. Because scheduler 304 maintains counts, rather than actual queues for each network user, memory is conserved and the scheduling algorithm implemental by phantom scheduler 304 and rated limiter 302 is simplified over implementations where separate real queues are maintained for each network user.

According to one embodiment, as additional excess bandwidth becomes available on output 306, the counts in counters 316, 318, and/or 320 may be decremented. By decrementing the counts, excess bandwidth is provided to the non-CIR packets of the network users associated with the counts. The counts may be decremented based on weights assigned to each network user. For example, the counts for network users A, B, and C may be decremented by 2, 1, and 1, respectively, if network user A is assigned twice the excess bandwidth of network users B and C. Thus, network user A will receive a greater portion of the excess bandwidth. The count for each network user may be decremented equally if each network user is assigned an equal share of the excess bandwidth. Further, the counts may be decremented simultaneously or at different times in a round robin fashion or in a least recently used (LRU) fashion.

Table 1 below shows exemplary states and data of system 300 at time intervals 1-4 as non-CIR packets 308, 310, 312, and 314 are received.

TABLE 1

Exemplary States and Data of the Packet Allocation System

| Time Interval | Network User Non-CIR Packet at Rate Limiter | Count for the Network User | Kill/ Forward | New Count for the Network User |
|---|---|---|---|---|
| 1 | C | 5 | Forward | 6 |
| 2 | B | 5 | Forward | 6 |
| 3 | B | 6 | Kill | 6 |
| 4 | A | 5 | Forward | 6 |

In this example, the initial count stored in counters 316, 318, and 320 is assumed to be 5. Further, the threshold level for counters 316, 318, and 320 is assumed to be 6. At time interval 1, non-CIR packet 314 from network user C is received at rate limiter 302. Because the current count 5 for network user C is less than the threshold level 6, non-CIR packet 314 can be forwarded to output 306. The count for network user C in counter 320 is then incremented to 6. Therefore, subsequent non-CIR packets for network user C will be killed unless the count is decremented or the threshold level is increased.

At time interval 2 of Table 1, non-CIR packet 312 associated with network user B is received at rate limiter 302. The current count for network user B is 5 and the threshold level is 6. Because the current count 5 for network user B is less than the threshold level 6, non-CIR packet 312 can be forwarded to output 306. Next, the count for network user B in counter 318 is incremented to 6. Subsequent non-CIR packets for network user B will be killed unless the count is decremented or the threshold level is increased.

At time interval 3 of Table 1, non-CIR packet 310 associated with network user B is received at rate limiter 302. The current count for network user B is 6 and the threshold level is 6. Because the current count 6 for network user B is equal to the threshold level 6, non-CIR packet 310 can be killed. The count for network user B in counter 318 remains at 6.

At time interval 4 of Table 1, non-CIR packet 308 associated with network user A is received at rate limiter 302. The current count for network user A is 5 and the threshold level is 6. Because the current count 5 for network user A is less than the threshold level 6, non-CIR packet 308 can be forwarded to output 306. The new count for network user A in counter 316 is incremented to 6. Subsequent non-CIR packets for network user A will be killed unless the count is decremented or the threshold level is increased. Further, the counts can be byte counts rather than packet or cell counts.

According to one embodiment, a phantom scheduler can receive non-CIR packets and determine whether the packets are forwarded to an output or killed based on packets counts as described herein. The phantom scheduler can include the functionality of phantom scheduler 304 and rate limiter 302 as described herein for allocating excess bandwidth.

Figure 4:
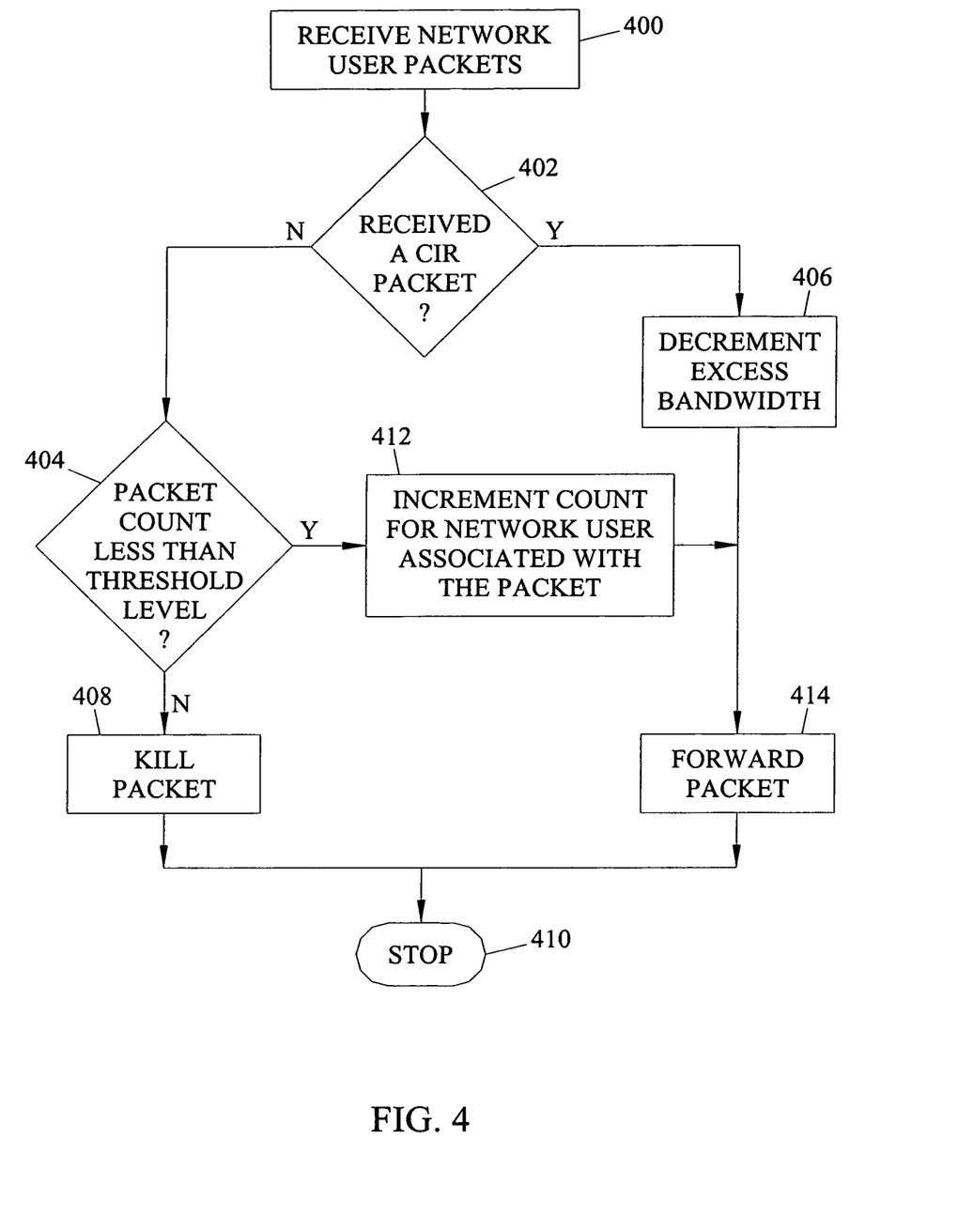
FIG. 4 is a flow chart of exemplary steps for allocating excess bandwidth of an output of the system of FIG. 3 among network users according to an embodiment of the subject matter described herein.

FIG. 4 is a flow chart illustrating exemplary steps for allocating excess bandwidth of output 306 of system 300 among network users A, B, and C according to an embodiment of the subject matter described herein. Referring to FIG. 4, in step 400, the network device can receive a plurality of network user packets including CIR and non-CIR packets. Next, at step 402, it can be determined whether a received packet is a CIR packet. If the received packet is not a CIR packet, the process can proceed to step 404. Otherwise, if the received packet is a CIR packet, the process can proceed to step 406.

At step 404 of FIG. 4, it can be determined whether a count maintained for the network user is less than a threshold level for the network user. If the count is not less than the threshold level, the packet can be killed at step 408 and the process stops at step 410. Otherwise, if the count is less than the threshold level, the process proceeds to step 412. At step 412, the count for the network user associated with the packet is incremented. Next, at step 414, the packet is forwarded to output 306. The process then stops at step 410.

Returning to step 402, if a CIR packet is received, control proceeds to step 406 where step 406, the excess bandwidth of output 306 can be decremented. Next, in step 414, the packet is forwarded to output 306. The excess bandwidth may be decremented because the packet utilizes the bandwidth of output 306. Further, as stated above, if additional excess bandwidth becomes available, the counts maintained in counters 316, 318, and 320 can be decremented by phantom scheduler 304 when it schedules packets.

According to one embodiment, non-CIR packets may be killed based on more than one count of packet parameters of network users. For example, a phantom scheduler may maintain counters for tracking total number of non-CIR packets received for the network user and the number of non-CIR packets received of a class of service for the network user. For example, a user may have multiple classes of service, each with its own count. In such an implementation, the phantom scheduler may schedule or kill packets from each user based on the per-user counts and thresholds. Within each user's packets, the phantom scheduler may schedule or kill packets based on the counts and thresholds for each packet class. In this way, network user packets can be allocated bandwidth based on more than one parameter.

Figure 5:
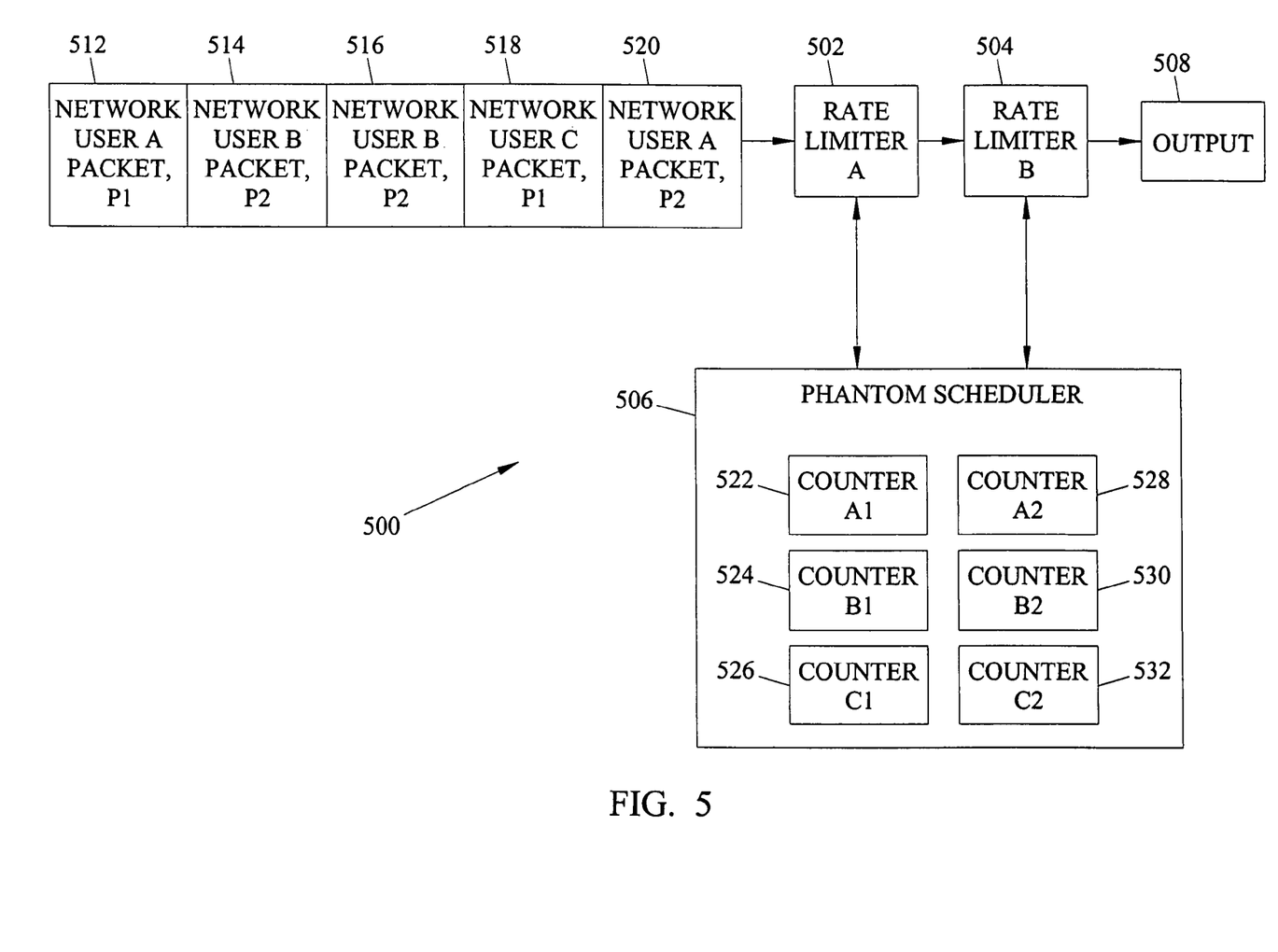
FIG. 5 is another exemplary bandwidth allocation system for allocating excess bandwidth among a plurality of network users based on more than one packet parameter according to an embodiment of the subject matter described herein.

FIG. 5 illustrates an exemplary bandwidth allocation system, generally designated 500, for allocating excess bandwidth among a plurality of network users based on more than one packet parameter according to an embodiment of the subject matter described herein. Referring to FIG. 5, system 500 includes a rate limiter A 502, a rate limiter B 504, a phantom scheduler 506, and an aggregated output 508. System 500 may be implemented in a network device including components for forwarding CIR packets to output 508. Packets that are identified as non-CIR packets may be killed or forwarded to output 508.

Rate limiters A 502 and B 504 can receive a plurality or network user packets including non-CIR packets 510, 512, 514, 516, 518, and 520 from different network users. The packets can have different priorities. Rate limiter A 502 can notify scheduler 506 of the priority of the packet received for the network user. Rate limiter B 504 can notify scheduler 506 of the network user associated with each received non-CIR packet. In this example, the packets can be associated with either customer A, B, or C and can have either priority P1 or P2, where P1 is a higher priority than P2.

Scheduler 506 can include counters $A_{priority}$ 522, $B_{priority}$ 524, and $C_{priority}$ 526 for maintaining counts of received non-CIR packets for network users A, B, and C, respectively, having priority P2. If a priority P2 count for a network user is equal to or exceeds a predetermined priority threshold level for the network user for priority P2, rate limiter A 502 can be notified for killing the non-CIR packet for the network user. If a count for a network user is less than the predetermined priority threshold level, rate limiter A 502 can forward the non-CIR packet to rate limiter B 504.

Further, scheduler 506 can include counters $A_{total}$ 528, $B_{total}$ 530, and $C_{total}$ 532 for maintaining counts of a number of received non-CIR packets for network users A, B, and C, respectively. If a count for a network user is equal to or exceeds a predetermined threshold level for the network user, rate limiter B 504 can be notified for killing the non-CIR packet for the network user. If a count for a network user is less than the predetermined packet number threshold level, rate limiter B 504 can forward the non-CIR packet to output 508, and scheduler 506 can increment the count in the counters associated with the network user. For example, for network user A, the counts in counters $A_{priority}$ 522 and/or $A_{total}$ 528 can be incremented, depending on the priority level of the packet received.

The counts in counters $A_{priority}$ 522, $B_{priority}$ 524, $C_{priority}$ 526, $A_{total}$ 528, $B_{total}$ 530, and/or $C_{total}$ 532 may be decremented as additional excess bandwidth becomes available on output 508. The counts may be decremented based on weights assigned to the network users.

Figure 6:
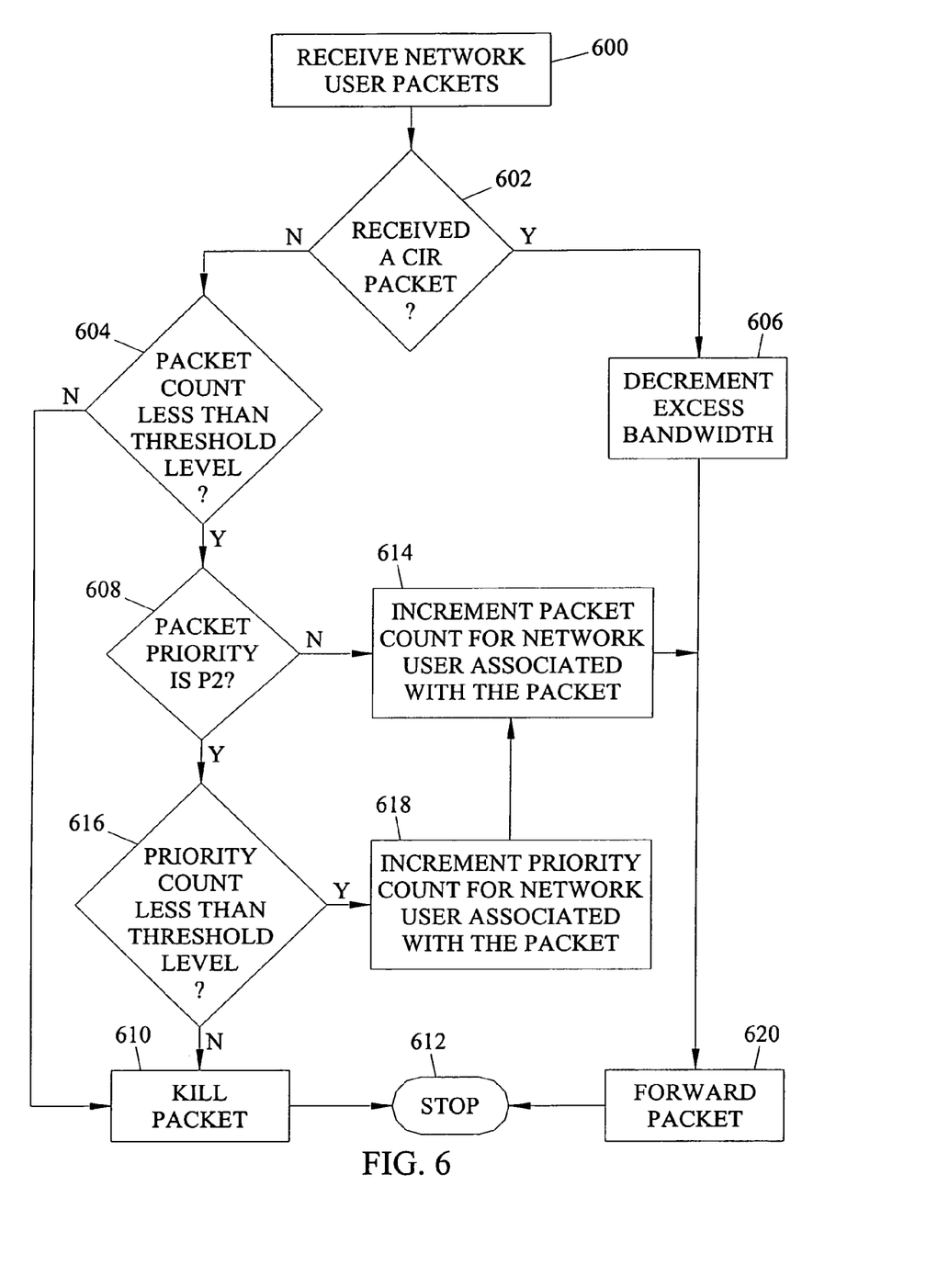
FIG. 6 is a flow chart of exemplary steps for allocating excess bandwidth of an output of system of FIG. 5 among network users based on more than one packet parameter according to an embodiment of the subject matter described herein.

FIG. 6 is a flow chart illustrating exemplary steps for allocating excess bandwidth of output 508 of system 500 among network users A, B, and C based on more than one packet parameter according to an embodiment of the subject matter described herein. Referring to FIG. 6, in step 600, the network device can receive a plurality of network user packets including CIR and non-CIR packets. The packets can have different priorities. At step 602, it can be determined whether a received packet is a CIR packet. If the received packet is not a CIR packet, the process can proceed to step 604. Otherwise, if the received packet is a CIR packet, the process can proceed to step 606.

At step 604, it can be determined whether the priority count maintained for the network user associated with the packet is less than a priority threshold level for the network user. If the priority count is not less than the priority threshold level, rate limiter A 502 can be notified for killing the non-CIR packet at step 608. The process can then stop at step 610. Otherwise, if the priority count is less than the priority threshold level, the process can proceed to step 612.

At step 612 of FIG. 6, it can be determined whether the per-user count ($A_{priority}$, $B_{priority}$, or $C_{priority}$) maintained for the network user associated with the packet is less than a packet number threshold level for the network user. If the count is less than the packet number threshold level, the process can proceed to step 614. Otherwise, if the count is not less than the packet number threshold level, rate limiter B 504 can be notified for killing the non-CIR packet at step 608. The process can then stop at step 610.

At step 614, scheduler 506 can increment the packet count and the priority count maintained for the network user associated with the packet. Next, at step 616, the packet can then be forwarded to output 508 and the process can stop at step 610.

As stated above, if the received packet is a CIR packet at step 602, the process can proceed to step 606. At step 606, the excess bandwidth of output 508 can be decremented. Next, at step 616, the packet is forwarded to output 508. The excess bandwidth may be decremented because the packet utilizes the bandwidth of output 508. Further, as stated above, if additional excess bandwidth becomes available, the counts of counters $A_{priority}$ 522, $B_{priority}$ 524, $C_{priority}$ 526, $A_{total}$ 528, $B_{total}$ 530, and/or $C_{total}$ 532 can be decremented.

According to one embodiment, the threshold levels of network users can be adjusted with respect to one another so that one or more network users can utilize more of the excess bandwidth than others. For example, a first threshold level can be set to 10 and a second threshold level set to 5 such that the network user associated with the first threshold level can utilize more of the excess bandwidth than the network user associated with the second threshold level. In this way, higher priority network users can have higher threshold levels. In addition, additional weights can be added to lower priority network users so that the phantom scheduler will dequeue at a higher rate for the higher priority network users. In this way, once the threshold level is reached for a steady state condition, the packets that are dequeued at a greater rate are the higher priority packets because the lower priority packets have a lower weight.

According to another embodiment, the number of counts can equal the number of users multiplied by the number of priority levels. This number of counts handles priority levels for the user but there may be no total count per user. The counts can be utilized for comparing to a threshold level for determining whether to kill or forward a packet as described herein.

Excess bandwidth on outputs can be more efficiently allocated by killing and forwarding non-CIR packets based on counts. In particular, memory can be conserved, packet latency reduced, and complexity reduced.

As described herein, a count of the total number of received non-CIR packets or a parameter of non-CIR packets for each network user may be maintained. A non-CIR packet may be killed or prevented from being forwarded to the output in response to a count of the number of non-CIR packets received for an associated network user having a predetermined relationship with respect to a predetermined threshold level. In particular, the packet can be killed if the count is greater than or equal to the threshold level.

According to one refinement of the methods and systems described herein, counters can maintain counts of more than one packet parameter. A received non-CIR packet may be killed or prevented from being forwarded to the output in response to one or more of the counts associated with the received non-CIR packet having a having a predetermined relationship with respect to one or more predetermined threshold levels. In particular, the packet can be killed if the count is greater than or equal to a threshold level. Further, the packet can be killed if a count of the number of packets received of a predetermined priority is greater than or equal to a threshold level.

According to another refinement of the methods and systems described herein, a phantom scheduler may be implemented with a token bucket. In one embodiment, the tokens can be added to the token bucket at predetermined intervals according to a rate of bandwidth available at the output. Tokens may be removed from the bucket for CIR packets. The remaining tokens are those tokens available for excess bandwidth. The scheduler can decrement the user counts if there are tokens available and the tokens are decremented.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for allocating excess bandwidth of an output among a plurality of network users, the method comprising:
   receiving, at a packet forwarding device, a plurality of packets associated with a plurality of network users for forwarding to an output, the plurality of packets including a packet associated with a first network user;
   determining whether the received packet is one of: a committed information rate (CIR) packet for which bandwidth is guaranteed at the output and a non-CIR packet for which bandwidth is not guaranteed at the output;
   maintaining, in the packet forwarding device, a count of non-CIR packets sent for the first network user, wherein maintaining the count of non-CIR packets for the first network user includes maintaining a count of non-CIR packets sent for the first network user prior to receiving the plurality of packets; and
   in response to the packet received for the first network user being a non-CIR packet:
     incrementing the count;
     in response to the count having a predetermined relationship with respect to a threshold level, preventing the non-CIR packet from being forwarded to the output; and
     in response to the count not having the predetermined relationship with respect to the threshold level, allowing the non-CIR packet received for the first network user to be forwarded to the output.

2. The method of claim 1 wherein the plurality of packets comprises CIR packets, and wherein the method further comprises forwarding the CIR packets to the output.

3. The method of claim 1 wherein preventing the non-CIR packet from being forwarded comprises preventing the first non-CIR packet from being forwarded to the output in response to the count being greater than or equal to the threshold level.

4. The method of claim 1 wherein allowing the first non-CIR packet to be forwarded to the output in response to the count not having the predetermined relationship includes allowing the first non-CIR packet to be forwarded to the output in response to the count being less than the threshold level.

5. The method of claim 1 comprising decrementing the count in response to additional excess bandwidth becoming available at the output.

6. The method of claim 5 wherein decrementing the count comprises decrementing the count based on a weight assigned to the first network user.

7. The method of claim 1 wherein the count of non-CIR packets is composed of a count selected from the group consisting of a count of bytes and a count of cells.

8. The method of claim 1 wherein the count is a first count, the predetermined relationship is a first predetermined relationship, the threshold level is a first threshold level, and where the method further comprises:
   (a) maintaining a second count of a predetermined parameter for non-CIR packets received of the first network user; and
   (b) preventing the first non-CIR packet from being forwarded to the output in response to the second count having a second predetermined relationship with respect to a second threshold level.

9. The method of claim 8 wherein the predetermined parameter is a predetermined priority of the received packet.

10. The method of claim 8 comprising decrementing the first or second count in response to additional excess bandwidth becoming available on the output.

11. The method of claim 8 comprising forwarding the non-CIR packet to the output in response to the first and second counts being less than the first and second threshold levels, respectively.

12. The method of claim 1 comprising:
   (a) maintaining a count of CIR packets sent for each of the network users;
   (b) sending non-CIR packets for each of the network users in response to the count for each of the network users being less than the threshold level; and
   (c) preventing the sending of non-CIR packets for each of the network users in response to the count for each of the network users being less than the threshold.

13. A method for allocating excess bandwidth of an output among a plurality of network users, the method comprising:
   receiving, at a packet forwarding device, a plurality of packets associated with a plurality of network users for forwarding to an output, the plurality of packets including a first non-committed information rate (CIR) packet associated with a first network user;
   maintaining, in the packet forwarding device, a count of non-CIR packets sent for the first network user;
   preventing the first non-CIR packet from being forwarded to the output in response to the count having a predetermined relationship with respect to a threshold level;
   wherein the count is a first count, the predetermined relationship is a first predetermined relationship, the threshold level is a first threshold level, and wherein the method further comprises:
     maintaining a second count of a predetermined parameter for non-CIR packets received of the first network user, wherein the predetermined parameter is a predetermined priority of the received packet, and
     preventing the first non-CIR packet from being forwarded to the output in response to the second count having a second predetermined relationship with respect to a second threshold level; and decrementing the first count in response to additional excess bandwidth becoming available on the output, and decrementing the second count based on a weight assigned to the first network user in response to additional excess bandwidth becoming available on the output.

14. A bandwidth allocation system for allocating excess bandwidth among a plurality of network users, the system comprising:

a phantom scheduler for maintaining a count of non-committed-information-rate (non-CIR) packets sent for a first network user of a plurality of network users and for determining whether the count has a predetermined relationship with respect to a threshold level, wherein the count includes a count of non-CIR packets received for a first network user prior to a current packet received for the first network user, wherein it is determined whether the current received packet is one of: a CIR packet and a non-CIR packet, and wherein, in response to the packet being a non-CIR packet, the count is incremented; and a rate limiter for receiving packets for the network users, the non-CIR packets including the non-CIR packet to be sent for the first network user, for preventing the non-CIR packet from being forwarded to an output in response to the count having the predetermined relationship with respect to the threshold level, and for allowing the non-CIR packet to be sent to the output in response to the count not having the predetermined relationship with respect to the threshold.

15. The bandwidth allocation system of claim 14 wherein the plurality of packets comprises CIR packets, and the rate limiter is operable to forward the CIR packets to the output.

16. The bandwidth allocation system of claim 14 wherein the rate limiter is operable to prevent the first non-CIR packet from being forwarded to the output in response to the count being greater than or equal to the threshold level.

17. The bandwidth allocation system of claim 14 wherein the rate limiter is operable to forward the non-CIR packet to the output in response to the count being less than the threshold level.

18. The bandwidth allocation system of claim 14 wherein the phantom scheduler is operable to decrement the count in response to additional excess bandwidth becoming available at the output.

19. The bandwidth allocation system of claim 18 wherein the phantom scheduler is operable to decrement the count based on a weight assigned to the first network user.

20. The bandwidth allocation system of claim 14 wherein the count of non-CIR packets is composed of a count selected from the group consisting of a count of bytes and a count of cells.

21. The bandwidth allocation system of claim 14 wherein the count is a first count, the predetermined relationship is a first predetermined relationship, the threshold level is a first threshold level, the rate limiter is a first rate limiter, wherein the phantom scheduler is operable to maintain a second count of a predetermined parameter for non-CIR packets received of the first network user, and wherein the system further comprises a second rate limiter for preventing the first non-CIR packet from being forwarded to the output in response to the second count having a second predetermined relationship with respect to a second threshold level.

22. The bandwidth allocation system of claim 21 wherein the predetermined parameter is a predetermined priority of the received packet.

23. The bandwidth allocation system of claim 21 wherein the phantom scheduler is operable to decrement the first or second count in response to additional excess bandwidth becoming available on the output.

24. The bandwidth allocation system of claim 21 wherein the rate limiter is operable to forward the non-CIR packet to the output in response to the first and second counts being less than the first and second threshold levels, respectively.

25. The method of claim 14 wherein the phantom scheduler is operable to maintain a count of CIR packets sent for each of the network users, wherein the rate limiter is operable to send non-CIR packets for each of the network users in response to the count for each of the network users being less than the threshold level, and wherein the rate limiter is operable to prevent the sending of non-CIR packets for each of the network users in response to the count for each of the network users being less than the threshold.

26. A bandwidth allocation system for allocating excess bandwidth among a plurality of network users, the system comprising:

a phantom scheduler for maintaining a count of non-committed-information-rate (non-CIR) packets sent for a first network user of a plurality of network users and for determining whether the count has a predetermined relationship with respect to a threshold level;

a rate limiter for receiving non-CIR packets for the network users, the non-CIR packets including a first non-CIR packet to be sent for the first network user, and for preventing the first non-CIR packet from being forwarded to an output in response to the count having the predetermined relationship with respect to the threshold level; wherein the count is a first count, the predetermined relationship is a first predetermined relationship, the threshold level is a first threshold level, the rate limiter is a first rate limiter, wherein the phantom scheduler is operable to maintain a second count of a predetermined parameter for non-CIR packets received of the first network user, and wherein the system further comprises a second rate limiter for preventing the first non-CIR packet from being forwarded to the output in response to the second count having a second predetermined relationship with respect to a second threshold level; and wherein the phantom scheduler is operable to decrement the first count in response to additional excess bandwidth becoming available on the output, and wherein the phantom scheduler is operable to decrement the second count based on a weight assigned to the first network user in response to additional excess bandwidth becoming available on the output.

27. A computer readable medium embodied with computer executable instructions for performing steps comprising:

receiving a plurality of packets associated with a plurality of network users for forwarding to an output, the plurality of packets including a packet associated with a first network user;

determining whether the received packet is one of: a committed information rate (CIR) packet for which bandwidth is guaranteed at the output and a non-CIR packet for which bandwidth is not guaranteed at the output;

maintaining a count of non-CIR packets sent for the first network user, wherein maintaining the count of non-CIR packets for the first network user includes maintaining a count of non-CIR packets sent for the first network user prior to receiving the plurality of packets; in response to the packet received for the first network user being a non-CIR packet:
incrementing the count; in response to the count having a predetermined relationship with respect to a threshold level, preventing the non-CIR packet from being forwarded to the output; and in response to the count not having the predetermined relationship with respect to the threshold level, allowing the non-CIR packet received for the first network user to be forwarded to the output in response to the count not having the predetermined relationship with respect to the threshold.

28. The computer readable medium of claim 27 wherein the plurality of packets comprises CIR packets, and comprising forwarding the CIR packets to the output.

29. The computer readable medium of claim 27 wherein preventing the non-CIR packet from being forwarded comprises preventing the first non-CIR packet from being forwarded to the output in response to the count being greater than or equal to the threshold level.

30. The computer readable medium of claim 27 wherein allowing the first non-CIR packet to be forwarded to the output in response to the count not having the predetermined relationship includes allowing the first non-CIR packet to be forwarded to the output in response to the count being less than the threshold level.

31. The computer readable medium of claim 27 wherein the count of non-CIR packets is composed of a count selected from the group consisting of a count of bytes and a count of cells.

32. The computer readable medium of claim 27 comprising decrementing the count in response to additional excess bandwidth becoming available on the output.

33. The computer readable medium of claim 32 wherein decrementing the count comprises decrementing the count based on a weight assigned to the first network user.

34. The computer readable medium of claim 33 wherein the count is a first count, the predetermined relationship is a first predetermined relationship, the threshold level is a first threshold level, and comprising: maintaining a second count of a predetermined parameter for non-CIR packets received of the first network user; and preventing the first non-CIR packet from being forwarded to the output in response to the second count having a second predetermined relationship with respect to a second threshold level.

35. The computer readable medium of claim 34 wherein the predetermined parameter is a predetermined priority of the received packet.

36. The computer readable medium of claim 34 comprising decrementing the first or second count in response to additional excess bandwidth becoming available on the output.

37. The computer readable medium of claim 34 comprising forwarding the first non-CIR packet to the output in response to the first and second counts being less than the first and second threshold levels, respectively.

38. The computer readable medium of claim 27 comprising:
maintaining a count of CIR packets sent for each of the network users;
sending non-CIR packets for each of the network users in response to the count for each of the network users being less than the threshold level; and
preventing the sending of non-CIR packets for each of the network users in response to the count for each of the network users being less than the threshold.

39. A computer readable medium embodied with computer executable instructions for performing steps comprising:
receiving a plurality of packets associated with a plurality of network users for forwarding to an output, the plurality of packets including a first non-committed information rate (CIR) packet associated with a first network user;
maintaining a count of non-CIR packets sent for the first network user;
preventing the first non-CIR packet from being forwarded to the output in response to the count having a predetermined relationship with respect to a threshold level;
decrementing the count in response to additional excess bandwidth becoming available on the output;
wherein decrementing the count comprises decrementing the count based on a weight assigned to the first network user; wherein the count is a first count, the predetermined relationship is a first predetermined relationship, the threshold level is a first threshold level;
maintaining a second count of a predetermined parameter for non-CIR packets received of the first network user;
preventing the first non-CIR packet from being forwarded to the output in response to the second count having a second predetermined relationship with respect to a second threshold level; and
decrementing the first count in response to additional excess bandwidth becoming available on the output, and decrementing the second count based on a weight assigned to the first network user in response to additional excess bandwidth becoming available on the output.

* * * * *

UNITED STATES PATENT AND TRADEMARK OFFICE
CERTIFICATE OF CORRECTION

PATENT NO.       : 7,619,971 B1                                    Page 1 of 1
APPLICATION NO. : 11/129991
DATED            : November 17, 2009
INVENTOR(S)      : Siva et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this

Twenty-sixth Day of October, 2010

David J. Kappos
*Director of the United States Patent and Trademark Office*